United States Patent Office 3,228,784
Patented Jan. 11, 1966

3,228,784
AMORPHOUS HYDROGEN ALUMINO
SILICATE PIGMENTS
Robert K. Mays, Havre de Grace, and Lloyd E. Williams, Bel Air, Md., assignors to J. M. Huber Corporation, Locust, N.J., a corporation of New Jersey
No Drawing. Filed Jan. 8, 1962, Ser. No. 165,029
1 Claim. (Cl. 106—288)

This invention relates to amorphous, finely divided hydrogen alumino silicate pigments and the process for their preparation.

Specifically, this invention involves reacting amorphous sodium alumino silicates with an acid under controlled conditions whereby the reactive sodium ions are replaced with the hydrogen ion of the acid. The products of this invention are acidic because the hydrogen ions which replace the sodium ions are mobile exchangeable ions. This is a reversible ion exchange reaction resulting in novel products characterized by retaining the original structure of the alumino silicate and retaining the molar ratio of $Al_2O_3$ to $SiO_2$ which is present in the precursor amorphous sodium alumino silicate.

The structural components of the precursor sodium alumino silicate can be characterized as being of the aluminosiloxane type wherein an aluminum atom coordinates with four oxygen atoms in a silica structure. In this type of coordination, the aluminum atom essentially takes the place of a silicon atom. This substitution of aluminum with an ionic charge of three for silicon with an ionic charge of four results in a negative charge at that site on the aluminosiloxane structure. The negative charge is satisfied by the simultaneous incorporation of a sodium atom. This structure can be depicted as $Na_2\overline{Ze}$ wherein $\overline{Ze}$ is the aluminosiloxane structure.

The result of this structure is to make available sodium ions for exchange with the hydrogen ions of acids. These so-called reactive sodium ions are replaced most readily by the hydrogen ions of strong or highly ionized acids such as sulfuric acid, nitric acid and hydrochloric acid. The resulting compound $H_2\overline{Ze}$ is acidic and the hydrogen ions which replaces the reactive sodium ions are replaceable by other cations. For example, if it is desired to regenerate the original $Na_2\overline{Ze}$, sodium hydroxide can be added to the novel hydrogen alumino silicates of this invention.

The hydrogen ion of the novel amorphous hydrogen alumino silicates of this invention can, if desired, be completely replaced by other cations such as lithium, calcium, magnesium, strontium, lead, tin, zinc, barium, ammonium or cadmium. To achieve this exchange it is necessary to treat either a slurry or filter cake of the hydrogen alumino silicate with a dilute solution of a soluble salt of the desired cation. For example, lead acetate can be used to produce lead alumino silicate. Similarly, lithium chloride, calcium chloride, magnesium chloride, strontium chloride, barium chloride, ammonium chloride or cadmium chloride can be used to produce the corresponding metal alumino silicate. On the other hand, because of a number of factors such as ionic equilibrium and alkalinity, the sodium ions of the precursor sodium alumino silicates are not as completely exchanged for other cations. For example, only 20% to 60% of the sodium ions are replaced by calcium or magnesium ions, while lead ions do not replace the sodium ions because an insoluble lead hydrate is formed.

Because of their acid nature the products of this invention can be used more satisfactorily than their alkaline precursor as an anti-caking conditioner for hygroscopic salts such as ammonium nitrate and sodium chloride. The alkaline pigments react with the ammonium salts causing decomposition, thus making them an unsuitable conditioning agent for such salts.

When used with or as an integral part of so-called fibrous glass insulation, the compounds of this invention, because of their acid nature, coact with the insulation to enhance its insulating properties and durability. On the other hand, the sodium alumino silicate precursor, because of its alkalinity, is unsuited for this use.

The products of this invention are also useful as a heavy metal ion scavenger because they have the ability to remove trace ions of these metals from weak acid solutions without either causing significant contamination of the solution with sodium ions or creating large pH shifts. The sodium alumino silicates, on the other hand, are heavy donors of basic ions and cause large pH shifts.

The unique products of this invention are also useful as catalyst substrates, insecticide carriers, salt conditioners, fillers and reinforcing pigment for rubber compounds, plastics, paper and paper coating compositions, paint, and adhesives.

The primary object of this invention is to provide finely divided amorphous hydrogen alumino silicates of submicron particle size.

A further object of this invention is to provide a useful ion exchange material.

Another object of this invention is to provide an anti-caking conditioner for inorganic hygroscopic salts.

An object of this invention is to provide a method of producing finely divided, amorphous hydrogen alumino silicates of submicron particle size.

Other objects and advantages will be apparent from the following specification:

The products of this invention are porous, finely divided amorphous materials whose structure and composition are dependent upon the material from which they are made. Since the aluminosiloxane structure of the starting material, $Na_2\overline{Ze}$, is substantially unaffected by the acid treatment, it is possible to produce amorphous hydrogen alumino silicates of varying compositions by utilizing as starting materials amorphous sodium alumino silicates containing the desired mole ratio of $SiO_2$ to $Al_2O_3$. It is possible to produce the novel products of this invention with from 2 to 16 moles of $SiO_2$ per mole of $Al_2O_3$ by reacting the corresponding amorphous finely divided sodium alumino silicate with a strong mineral acid, whereby substantially all the reactive sodium ions are replaced with hydrogen ions.

While theoretically it is possible to remove all the sodium ions from the precursor, in actual practice, if more than 95% of the sodium ions are removed, some of the alumina is solubilized, resulting in a partial collapse of the aluminosiloxane structure.

It is important in the process of producing the novel amorphous hydrogen alumino silicates of this invention that the method of adding acid to the finely divided amorphous sodium alumino silicate be strictly controlled. The acid can be added either to a reaction slurry of the alkaline pigment, a slurry formed from dried alkaline pigment or to a filter cake of the alkaline pigment. In any case, the acid addition must be such that no localized reactions take place. For example, when the acid is added to a reaction slurry of the alkaline pigment containing from 5% to 35% solids, the total acid additions, equivalent to the sodium of the sodium alumino silicate must be added to the slurry at such a rate that 5% of the sodium ions initially present are exchanged per minute. If the acid is added too rapidly the aluminosiloxane structure of the pigment decomposes and large amounts of alumina and silicic acid are found in the filtrate. The too rapid addition of acid also results in the treated slurry thickening upon standing and becoming an unfilterable gel. If the acid is added too slowly, the ion exchange reaction does take place but it is uneconomical. The concentration of the acid used is not critical, however, at higher concentrations a slower rate of addition is necessary to prevent localized reactions. For maximum effectiveness it is advantageous to use 5 N to 8 N acid added at an acid rate equivalent to removal of 5% by weight of the initial total sodium content per minute.

If the acid is added to a filter cake of the alkaline pigment on a vacuum filtering apparatus, care must be taken that the complete surface of the cake is covered by the acid and the acid must be added at such a rate that the filter cake remains moist, otherwise, the acid will channel through the cake causing localized reactions. The concentration of acid used to wash the filter cake should not exceed 5 N to 8 N, however, lower acid concentrations which have a lower viscosity are more convenient to use because of more rapid displacement through the filter cake because of the contact-treatment time requirements.

If it is desired, soluble aluminum or calcium salts such as aluminum sulfate or calcium chloride can be added to the alkaline pigment before the acid treatment. In the case of the slurry treatment, the soluble salts are added directly to the slurry before acid addition. In the case of the filter cake treatment, the soluble salts are added to a slurry of the alkaline pigment until the pH reaches 4.0, then the slurry is formed into a filter cake and the acid is added as before. These intermediate treating agents make sodium more accessible for hydrogen ion exchange with less solubilizing of alumina. It is important in order for the soluble salts to have an effect on sodium removal that the alkaline pigments be treated with the soluble salts before the acid treatment and also that the alkaline pigment contain fine, pre-precipitated silica which is formed in the process of making the alkaline pigments. It is also important that when soluble salts are used, no more than the stoichiometeric amount of acid be used.

The effects of treating the amorphous sodium alumino silicates with acid are: removal of substantially all the sodium ions, substantial maintenance of the silica to alumina mole ratios and retention of the aluminosiloxane structure, an increase in surface area and a lowering of pH. To achieve this effect it is advantageous to use a highly ionized acid, for example, strong mineral acids such as sulfuric acid, hydrochloric acid and nitric acid. Weakly ionized acids such as acetic acid are comparatively ineffective for replacing sodium ions with hydrogen ions.

Treating the amorphous sodium alumino silicate pigments with acid stoichiometrically equivalent to the sodium ion present, removes approximately 80 to 95% of the sodium and solubilizes a portion of that alumina which is not coordinated with the silica of the aluminosiloxane structure. This reaction is initially and throughout the procedure an ion exchange reaction, although the latter stages are combined with decomposition. The decomposition is most apparent when a large stoichiometric excess is used. For example, the use of 50% excess acid results in decomposition of up to one third of the alumina. The use of soluble aluminum or calcium salts as described hereinbefore decreases the decomposition and increases the removal of sodium ions.

The products of this invention retain the mole ratios of $SiO_2$ to $Al_2O_3$ of the precursor materials. This mole ratio in the precursor sodium alumino silicate is from 2 to 16 moles of $SiO_2$ to $Al_2O_3$ depending on the starting materials. The sodium content of the products of this invention varies from 0.02 to 0.7 mole of $Na_2O$ per mole of $Al_2O_3$. This ratio depends more on the extent of the acid treatment and resultant ion exchange than on the starting material.

The compounds used as the starting materials for the products of this invention are disclosed and prepared in accordance with the processes disclosed in U.S. Patents 2,739,073 and 2,848,346 as well as British Patent No. 706,537. These known pigments are characterized in part by having reactive sodium ions.

The starting materials of this invention are prepared by suitably commingling and reacting together at low concentrations, aqueous solutions of an alkali metal silicate and a water-soluble aluminum salt such as aluminum sulfate, aluminum chloride, aluminum nitrate or ammonium alum.

The pH of the reaction medium as well as the precipitating pH, and the type of silicate used are among the factors which determine the specific pigment produced; a variation in these factors determines the molar ratios of the oxides of sodium, aluminum and silicon as well as the particle size, specific gravity and suface area of the pigment. Pigments with molar ratios or above 0.8 mole of $Na_2O$ per mole of $Al_2O_3$ and at least about 4 moles of $SiO_2$ per mole of $Na_2O$ with a particle size of less than 0.14 micron in diameter, a specific gravity of 2.10 to 2.26 and a surface area greater than 20 square meters per gram are useful in the practice of this invention.

Another group of white, finely divided sodium alumino silicate pigments of submicron particle size which are useful in the practice of this invention are those produced by reacting an aqueous solution of caustic alkali with kaolin or kaolinitic clay in a finely divided state at temperatures of at least 120° C., thereby disintegrating the material into particles smaller than 0.5 micron in their largest dimension. The amount of caustic alkali used determines the composition of the pigment produced. The silica-alumina ratio varies depending on the starting material and is usually 2 moles of silica to one of alumina.

The preferred hydrogen alumino silicates of this invention which result from the acid treatment of the alkaline pigments described are those with molar ratios of 0.02 to 0.7 mole of $Na_2O$ per mole of $Al_2O_3$ and 11 to 700 moles $SiO_2$ per mole of $Na_2O$ and 8 to 14 moles of $SiO_2$ per mole $Al_2O_3$ with a particle size of less than 0.14 micron in diameter and a B.E.T. surface area between 40 square meters per gram and 300 square meters per gram.

The following examples are illustrative only and are not intended to limit the invention.

PREPARATION OF SODIUM ALUMINO SILICATES

*Example A*

836 pounds of a kaolin clay is uniformly dispersed in 831 pounds of water containing 2.1 pounds of tetrasodium pyrophosphate as a dispersing agent.

This dispersion is charged into a lead-lined reaction vessel and 928 pounds of commercial 66° Baumé sulfuric acid containing 93.1% by weight $H_2SO_4$ is added thereto. During addition the acid is intimately mixed with the clay dispersion and the reaction vessel is brought to and maintained at 100 pounds per square inch gauge and 338° F. for 3 hours while continuing the mixing. The clay-acid reaction slurry is then cooled and diluted with water to a final volume of 685 gallons.

A separate aqueous solution of sodium silicate is prepared containing 2490 pounds of $Na_2O \cdot 2.5SiO_2$ in a total solution volume of 1245 gallons.

930 gallons of 10% by weight sodium sulfate solution is introduced into a 6000 gallon reaction vessel and agitated. The sodium silicate solution is added to the sodium sulfate solution while the agitation is continued. The silicate solution is introduced into the reaction vessel at the center parallel to the agitator shaft and a few minutes later the addition of the clay-acid reaction slurry is started. The clay-acid reaction slurry is added at the outside periphery of the reaction mass at a rate which maintains an alkaline pH in the reaction vessel during the silicate addition interval.

After all the silicate solution is added, the clay-acid reaction slurry addition is continued to lower the pH of the reaction mass within the alkaline range. After the clay-acid reaction slurry addition is completed, the reaction slurry is digested with agitation. A reaction mass temperature of 140–160° F. is maintained throughout the precipitation and digestion periods. After digestion, the pH is readjusted to slightly basic. The reaction slurry is filtered, washed and 3550 pounds of fine sodium alumino silicate pigment is recovered.

*Example B*

Example A is repeated continuing the clay-acid reaction slurry additions until the pH of the reaction mass is slightly acid. Digestion at and readjustment to the same slightly acid pH is utilized prior to filtration and product recovery.

*Example C*

A solution of aluminum sulfate is prepared by dissolving 1032 kilograms of $Al_2(SO_4)_3 \cdot 14H_2O$ in 2500 liters of water. This solution is adjusted to a final volume of 3440 liters using additional water. The solution has a specific gravity of 1.160 corresponding to a concentration of 25.8% by weight $Al_2(SO_4)_3 \cdot 14H_2O$.

A separate aqueous solution of sodium silicate is prepared containing 1840 kilograms of $Na_2O \cdot 3.3SiO_2$ in a total solution volume of 8900 liters.

4430 liters of water is introduced into a reaction vessel equipped with an agitator operated in a manner to create a vortex in the water. The water is heated to 60° C. and while agitating, the sodium silicate solution is added slowly at the center of the vessel parallel to the agitator shaft. A few minutes later, the addition of the aluminum sulfate solution is begun by introducing it at the outside periphery of the reaction mass at a rate which maintains an alkaline reaction or precipitating pH during the silicate addition interval.

After all the silicate solution is added, the aluminum sulfate solution addition is continued to lower the pH within the alkaline range. The reaction slurry is digested while the agitation is continued and the pH is readjusted to the lower alkaline range. The reaction mass temperature is maintained at 60 C. throughout the reaction.

The reaction slurry is filtered, washed, and 2000 kilograms of sodium alumino silicate is recovered.

*Example D*

A suspension of 1160 grams of kaolin in 4500 cc. of water was placed in an autoclave and agitated therein throughout the treatment. To this suspension 360 grams of caustic soda was added and the temperature was then raised to 186° C. as rapidly as possible. After holding at this temperature for one hour, the slurry was cooled and filtered. The filter cake washed and dried at 105° C. The weight of the final cake was 1450 grams. When examined with the electron microscope the hexagonal plates characteristic of kaolinite were found to have disappeared almost entirely and substantially all the particles were below 0.2 micron in greatest dimension. The material was white and has a specific gravity of 2.16.

*Example E*

To a 4 to 6 liter of reaction water at room temperature, sodium metasilicate solution ($Na_2O \cdot SiO_2$) containing 1.85 moles (226 grams) per liter was introduced through the agitator impellor at 198–200 ml./min. rate until the pH was raised to between 10.8 and 11.5. Alum ($Al_2(SO_4)_3$) solution containing .366 mole (125 g.) per liter was introduced in the vortex at a rate to maintain the pH between 10.7 and 11.0 until all the metasilicate had been added. The alum feed was continued until the pH dropped to between 9.0 and 9.5. A white finely divided sodium alumino silicate was recovered.

PREPARATION OF HYDROGEN ALUMINO SILICATE

*Example F*

100 grams of the product of Example A was slurried in three liters of water at 25° C. With constant stirring enough 1.0 N $H_2SO_4$ to be equivalent to the $Na_2O$ in the pigment was added over a period of 20 minutes. The slurry was digested for 15 minutes. The product was filtered, washed and dried. Analysis of the product indicated 80% of the sodium ions were replaced by hydrogen ions and 6.7% of the $Al_2O_3$ was solubilized.

*Example G*

The procedure of Example F was repeated using the product of Example B in place of the product of Example A. Analysis showed 93% of the sodium ions were replaced by hydrogen ions and the $Al_2O_3$ remained substantially undisturbed.

*Example H*

The procedure of Example F was repeated, using the product of Example C in place of the product of Example A. Analysis showed 80.4% of the sodium ions were replaced by hydrogen ions and 6.3% of the $Al_2O_3$ was solubilized.

*Example I*

100 grams of the product of Example D was diluted with water to form a slurry containing 16% solids. With stirring 5 N $H_2SO_4$ was added to the slurry at the rate of about 90 mls./min. until an amount equivalent to all the sodium present was added. The reaction mixture was digested for an hour at a pH of 4.0–4.1. The slurry was then filtered and dried. Analysis indicated over 95% of the sodium ions were replaced by hydrogen ions and the $Al_2O_3$ remained substantially undisturbed.

*Example J*

The procedure of Example F was repeated using the product of Example E in place of the product of Example A. Analysis indicated that 84% of the sodium ions were replaced by hydrogen ions and 9.6% of the $Al_2O_3$ was solubilized.

*Example K*

The product of Examples A–E were each treated with soluble aluminum and calcium salts prior to the acid exchange. Analysis indicates that the replacement of sodium ions with hydrogen ions was improved in the case of the products from Examples A, B, and E with a concurrent less solubilizing of $Al_2O_3$. The results on the other cases indicate that the salts had no effect.

*Example L*

Each of the products of Examples A–E were formed into a filter cake and washed twice. A dilute solution of sulfuric acid equal to the stoichiometric amount of $Na_2O$ was passed through the cake. Analysis indicated 73% or more of the sodium ions had been replaced by hydrogen ions.

*Example M*

If each of the products of Examples A, B and E are treated with an alum solution prior to the acid treatment, a one third increase in sodium removal results.

The following tables illustrate typical hydrogen alumino silicates as produced by the process of this invention.

TABLE I

| Precursor sodium alumino silicate | | Corresponding hydrogen alumino silicate |
|---|---|---|
| Percent loss on ignition | 12.05 | 11.53 |
| Percent Na$_2$O | 9.02 | 1.51 |
| Percent Na$_2$SO$_4$ | 2.69 | 2.56 |
| Percent Al$_2$O$_3$ | 20.25 | 19.52 |
| Percent SiO$_2$ | 56.70 | 64.60 |
| Percent loss on ignition | 9.36 | 8.98 |
| Percent Na$_2$O | 6.48 | 1.45 |
| Percent Na$_2$SO$_4$ | 2.69 | 1.66 |
| Percent Al$_2$O$_3$ | 12.10 | 11.35 |
| Percent SiO$_2$ | 69.80 | 77.50 |
| Percent loss on ignition | 9.08 | 7.80 |
| Percent Na$_2$O | 5.37 | 1.17 |
| Percent Na$_2$SO$_4$ | 3.57 | 2.06 |
| Percent Al$_2$O$_3$ | 10.05 | 9.54 |
| Percent SiO$_2$ | 72.60 | 80.30 |
| Percent loss on ignition | 9.36 | 10.10 |
| Percent Na$_2$O | 6.48 | 0.32 |
| Percent Na$_2$SO$_4$ | 2.69 | 1.02 |
| Percent Al$_2$O$_3$ | 12.10 | 11.61 |
| Percent SiO$_2$ | 69.80 | 75.30 |
| Percent loss on ignition | 9.39 | 18.79 |
| Percent Na$_2$O | 15.21 | 0.45 |
| Percent Na$_2$SO$_4$ | .02 | 2.80 |
| Percent Al$_2$O$_3$ | 36.37 | 38.18 |
| Percent SiO$_2$ | 37.16 | 40.78 |

The products of this invention exhibit excellent ability to remove trace ions of heavy metals from weak acid solutions without significant contamination of the solution or large pH shifts. This utility is illustrated in the following:

*Example 1*

(A) A 10 gram filter cake of sodium alumino silicate was treated with a 200 ml. solution of copper sulfate (pH 5.0) containing 25 mg. of copper. The cake was washed to a filtrate volume of 300 ml. The pH of the filtrate was 9.95 and a qualitative test for copper was negative.

(B) The procedure of part (A) was repeated using 10 grams of hydrogen alumino silicate in place of sodium alumino silicate. The pH of the filtrate was 6.0 and a qualitative test for copper was negative.

*Example 2*

(A) 10 grams of sodium alumino silicate was formed into a filter cake and a 200 ml. solution of lead nitrate (pH 5.0) containing 50 mg. of lead was passed through the cake. The cake was washed to a filtrate volume of 300 ml. The filtrate pH was 10.0 and it contained 346 mg. of sodium. A qualitative test for lead was negative.

(B) The procedure of part (A) was repeated using 10 grams of hydrogen alumino silicate in place of sodium silicate. The filtrate pH was 6.4 and it contained 16.8 mg. of sodium. A qualitative test for lead was negative.

These examples illustrate the superiority of the hydrogen alumino silicates of this invention over the precursor sodium alumino silicates as heavy metal scavengers.

We claim:

A finely divided, amorphous, hydrogen alumino silicate pigment containing 0.02 to 0.7 mole of Na$_2$O per mole of Al$_2$O$_3$, 8 to 14 moles of SiO$_2$ per mole of Al$_2$O$_3$, and having a particle size of less than 0.14 micron in diameter and a BET surface area of from 40 square meters per gram to 300 square meters per gram.

References Cited by the Examiner

UNITED STATES PATENTS

| 2,180,576 | 11/1939 | Baylis et al. | 252—450 |
| 2,192,000 | 2/1940 | Wilson | 252—450 |
| 2,892,800 | 6/1959 | Taipale | 252—450 |
| 3,114,695 | 12/1963 | Rabo et al. | 23—111 |
| 3,130,006 | 4/1964 | Rabo et al. | 23—111 |

FOREIGN PATENTS

| 815,924 | 7/1959 | Great Britain. |

TOBIAS E. LEVOW, *Primary Examiner.*